(12) United States Patent
Winston et al.

(10) Patent No.: US 11,820,509 B2
(45) Date of Patent: Nov. 21, 2023

(54) RETRACTABLE DUCT CHANNEL WING

(71) Applicant: Hop Flyt, Inc., Lusby, MD (US)

(72) Inventors: Robert Allen Winston, Lusby, MD (US); Clark William Fuller, Lusby, MD (US)

(73) Assignee: Hop Flyt, Inc., Lusby, MD (US)

( * ) Notice: Subject to any disclaimer, the term of this patent is extended or adjusted under 35 U.S.C. 154(b) by 498 days.

(21) Appl. No.: 17/026,530

(22) Filed: Sep. 21, 2020

(65) Prior Publication Data
US 2021/0086897 A1 Mar. 25, 2021

Related U.S. Application Data

(60) Provisional application No. 62/903,008, filed on Sep. 20, 2019.

(51) Int. Cl.
*B64C 39/06* (2006.01)
*B64C 29/00* (2006.01)
*B64C 11/00* (2006.01)
*B64C 3/32* (2006.01)

(52) U.S. Cl.
CPC .......... *B64C 39/066* (2013.01); *B64C 11/001* (2013.01); *B64C 29/0033* (2013.01); *B64C 3/32* (2013.01)

(58) Field of Classification Search
CPC . B64C 39/066; B64C 11/001; B64C 29/0008; B64C 29/0016; B64C 29/0033; B64C 27/28; B64D 29/06
See application file for complete search history.

(56) References Cited

U.S. PATENT DOCUMENTS

| | | | | |
|---|---|---|---|---|
| 2,937,823 A | * | 5/1960 | Fletcher | B64C 29/0033 244/12.6 |
| 9,156,550 B2 | * | 10/2015 | Nam | B64C 11/00 |
| 11,124,286 B1 | * | 9/2021 | Piedmonte | B64C 11/001 |
| 2007/0231128 A1 | * | 10/2007 | Callas | F04D 29/164 415/173.3 |
| 2018/0086447 A1 | * | 3/2018 | Winston | B64C 39/066 |
| 2019/0106204 A1 | * | 4/2019 | Konishi | B64C 39/024 |
| 2020/0354051 A1 | * | 11/2020 | Besse | F02K 5/00 |
| 2022/0111972 A1 | * | 4/2022 | Besse | B64D 29/06 |

* cited by examiner

*Primary Examiner* — Michael H Wang
*Assistant Examiner* — Colin Zohoori
(74) *Attorney, Agent, or Firm* — IPEC/MIPLRC

(57) ABSTRACT

An embodiment of the invention provides a method where retractable ducts or shrouds are extended over propeller(s) that are fixed in wing channels on an aircraft during takeoff and landing to increase flight safety and efficiency. Fully extending the duct or shroud during takeoff increases lift and upward thrust, while retracting the duct or shroud and stowing the duct or shroud inside of the wing during forward cruise decreases aircraft drag and increases lift. Duct or shroud extension during takeoff also enables critical safety and noise cancellation functionality. The method provided for safe and efficient takeoff can be applied in reverse order for safe and efficient landing.

7 Claims, 6 Drawing Sheets

RETRACTABLE DUCT CHANNEL WING

BACKGROUND OF THE INVENTION

The present invention relates to aircraft; more particularly to an aircraft having channel wings and/or channel canards with a retractable duct around the propellers. The channels wings and channel canards may retract the duct to maximize thrust or retract the duct to minimize drag.

Aircraft utilizing the channel wing effect for lift are known in the art. Aircraft employing ducted or shrouded propellers to increase efficiency are also known in the art. Channel wings and channel canards having fully extended ducts improve the thrust during a rolling takeoff or vertical liftoff. Once aircraft reaches necessary forward speed for cruise flight, a fully extended duct has a problem of overall drag on the aircraft. A need exists for a channel wing with retractable duct to maximize thrust and minimize drag of the aircraft in different flight regimes.

BRIEF SUMMARY OF THE INVENTION

The present invention combines a channel wing with a retractable duct that will allow for extremely short takeoff distances or a vertical takeoff while being able to retract and lower the drag for high speed cruise.

Static thrust for a propeller can be improved by enclosing the propeller in a duct such that the tip clearances are small. Tip clearance is a distance between the propeller tip and the duct. The small tip clearance increases the thrust by reducing induced drag on the propeller and increasing the propeller's efficiency. Depending on numerous factors the thrust for the propellers can be increased upwards to 50% by using a duct. The channel wing lends itself well to a retractable duct as it already has a lower semi-circular shape that the upper duct can retract into. The disadvantage of a full duct is that, above an airspeed of approximately 60 MPH, the aerodynamic drag from the duct is greater than the increase in thrust provided by the duct. Thus, it is advantageous to retract the upper portion of the duct above this speed in order to reduce the overall drag and increase the overall speed of the air vehicle.

DETAILED DESCRIPTION OF THE INVENTION

Figure 1:
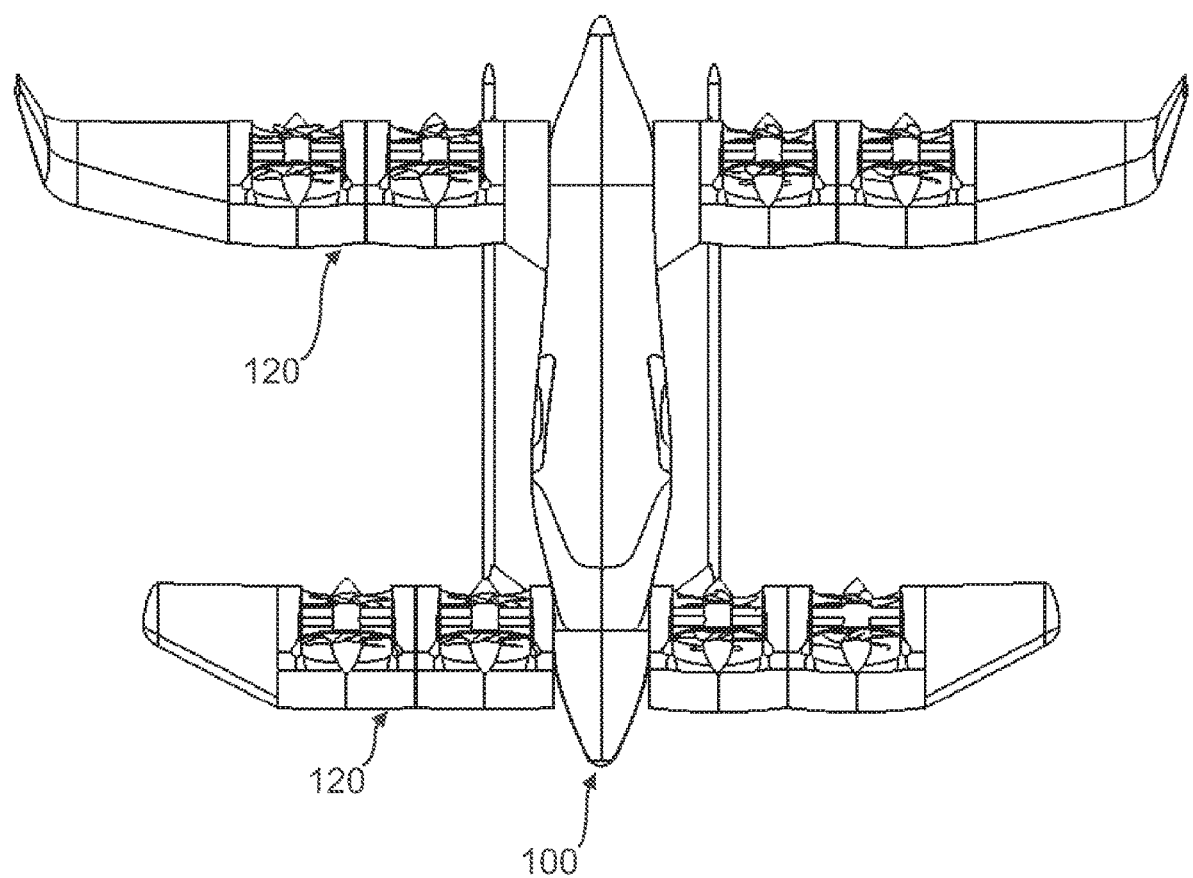
FIG. 1 is a top view of the aircraft with channel wings and channel canards with the ducts retracted, according to an embodiment.

FIG. 1 is a top view of the aircraft 100 showing the canard 120 and wing 110, both with wing channels with the ducts retracted, according to an embodiment. The aircraft 100 has a forward flight configuration wherein the eight ducts are in the retracted position.

Figure 2:
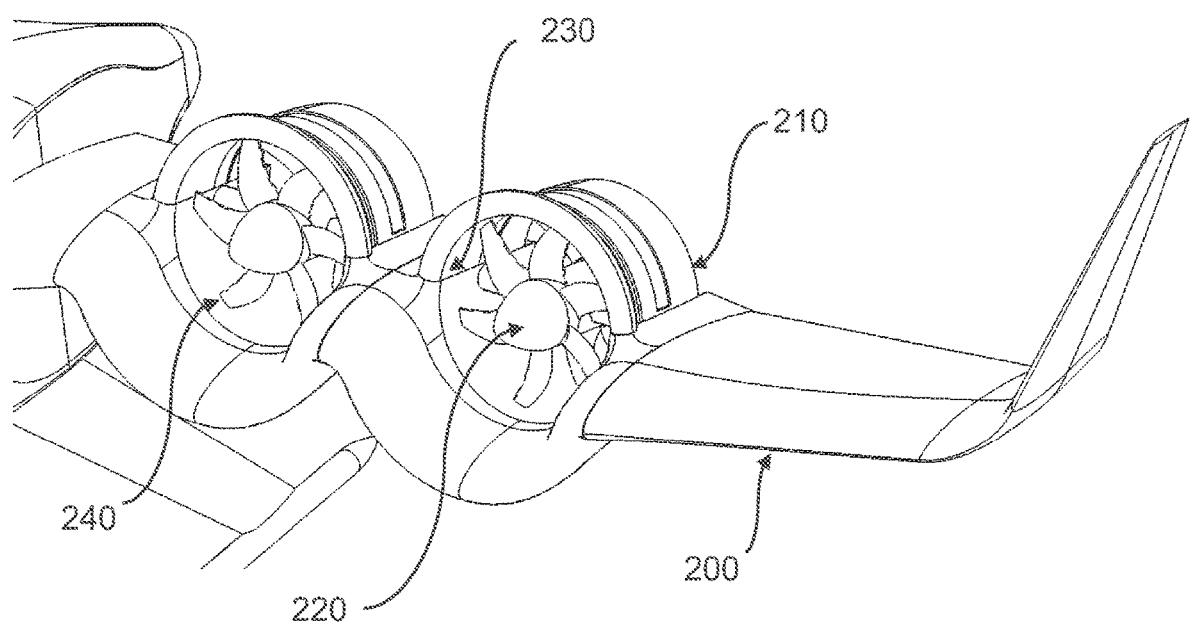
FIG. 2 is a perspective view of a channel wing with the upper portion of the ducts deployed, according to an embodiment.

FIG. 2 is a perspective view of a channel wing 200 with upper portion of the ducts 210 deployed, according to an embodiment. The upper portion of the duct is fully extended and encloses the propellers 220. One embodiment is made from various composite materials in certain areas in the inner portion 230 of the ducts. Various embodiments would work with a wide range of composite, insulation, and sound absorption materials. The propeller-duct tip clearance 240 is critical. The smaller the clearance, the better the trust and efficiency. In an embodiment the inside duct dimension and propeller is 36 inches, but size can vary.

Figure 3:
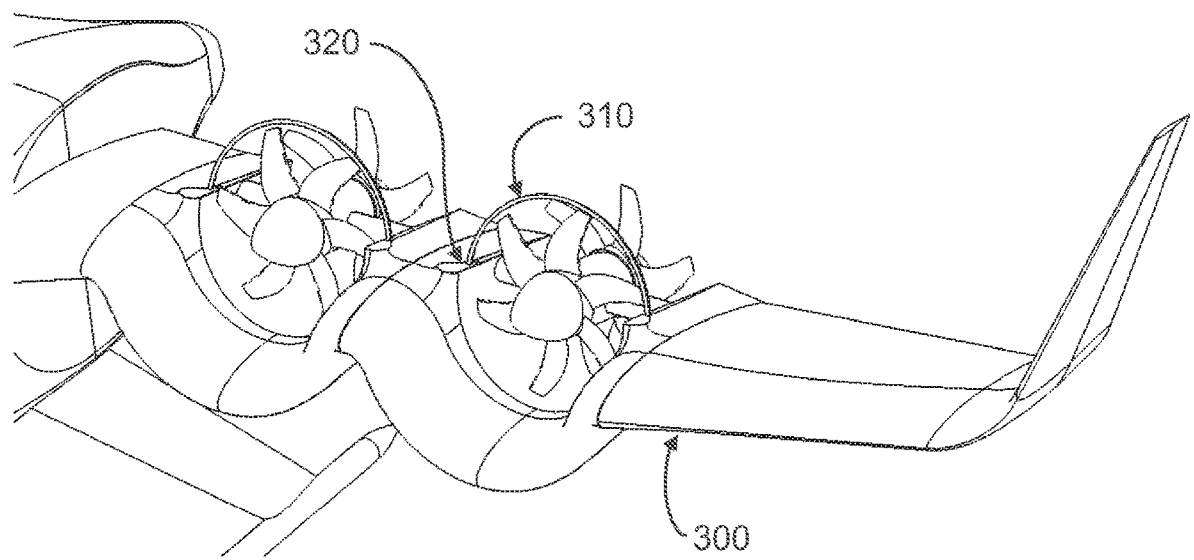
FIG. 3 is a perspective view of a channel wing with upper portion of the ducts retracted, according to an embodiment.

FIG. 3 is a perspective view of a channel wing 300 with upper portion of the ducts retracted, according to an embodiment. A guide ring 310 may be used to stabilize the duct itself for deployment and retraction. The guide ring 310 retains its position and during duct deployment becomes submerged into the upper shroud 320. The guide ring may be a ridged, low drag airfoil shape.

Figure 4:
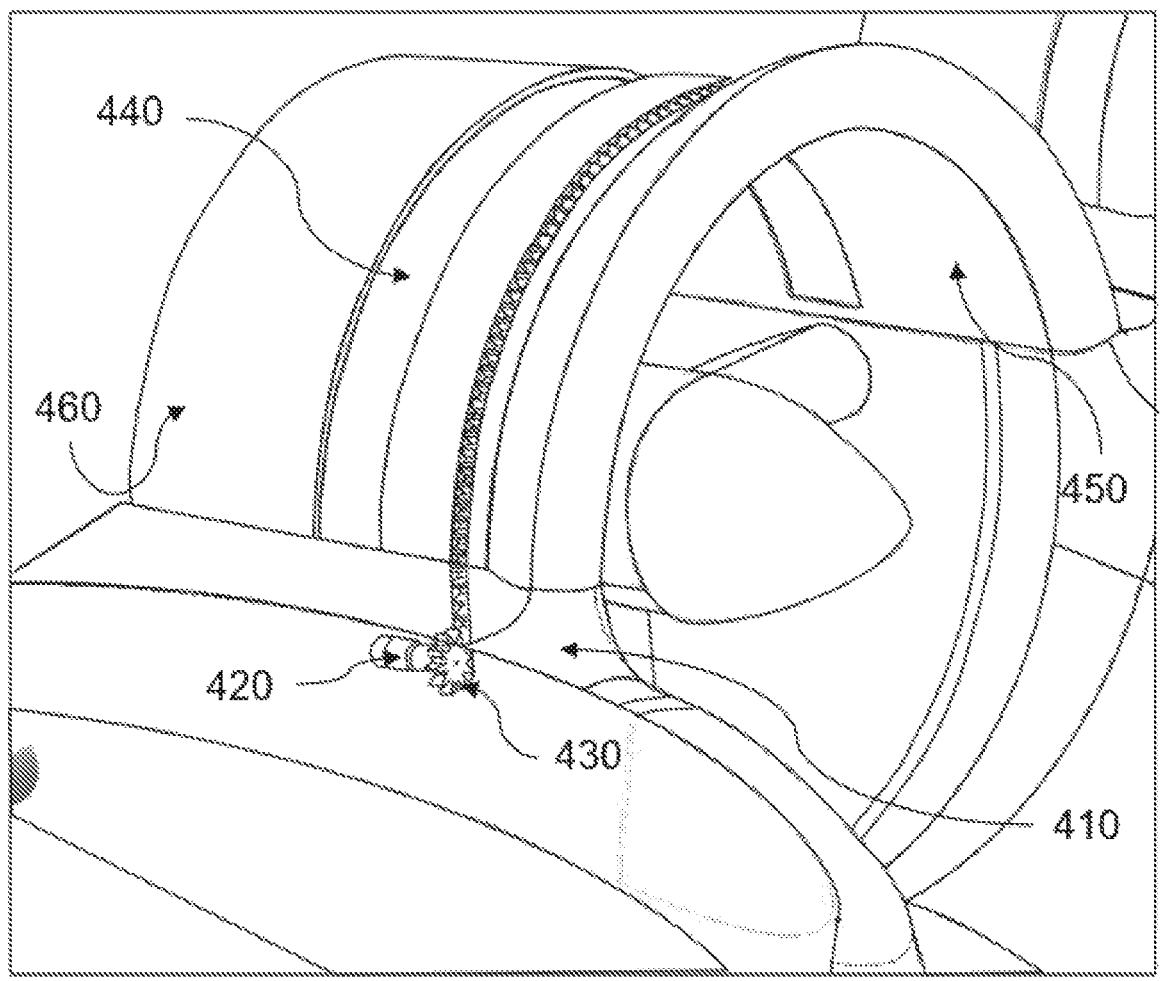
FIG. 4 is a perspective view of the mechanical parts of the duct, according to an embodiment.

FIG. 4 is a perspective view of the mechanical parts of the duct, according to an embodiment. Inside the lower duct 410, there may be a small, high torque motor 420, driven by a mechanical, electrical, hydraulic, and/or pneumatic system, that will be used to deploy and retract the upper duct. A ring gear 430 may be built into the forward portion of the upper duct which provides the gearing to move the duct. A duct bridge 440 is a movable piece that spans the gap between the forward duct 450 and rearward duct 460. The duct bridge automatically retracts around the spar when the duct retracts. The forward and rear portions of the upper shroud are attached at the two points shown.

Figure 5:
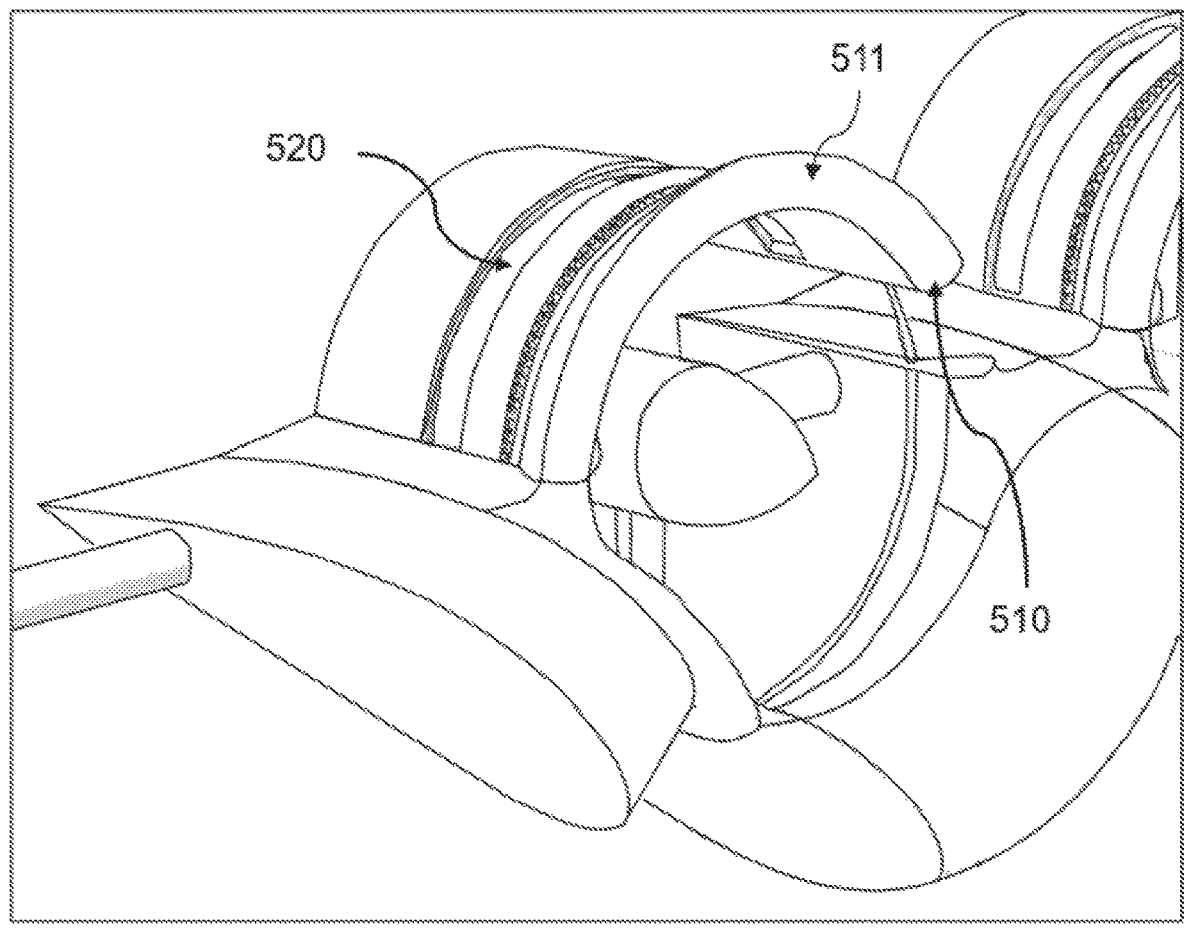
FIG. 5 is a perspective view of the partially retracted duct with the duct bridge retreated into the forward upper shroud, according to an embodiment.

FIG. 5 is a perspective view of the partially retracted duct 510 with the duct bridge 520 retreated into the forward upper shroud 511, according to an embodiment. The duct bridge 520 has a notch in it to passively or actively retract.

Figure 6:
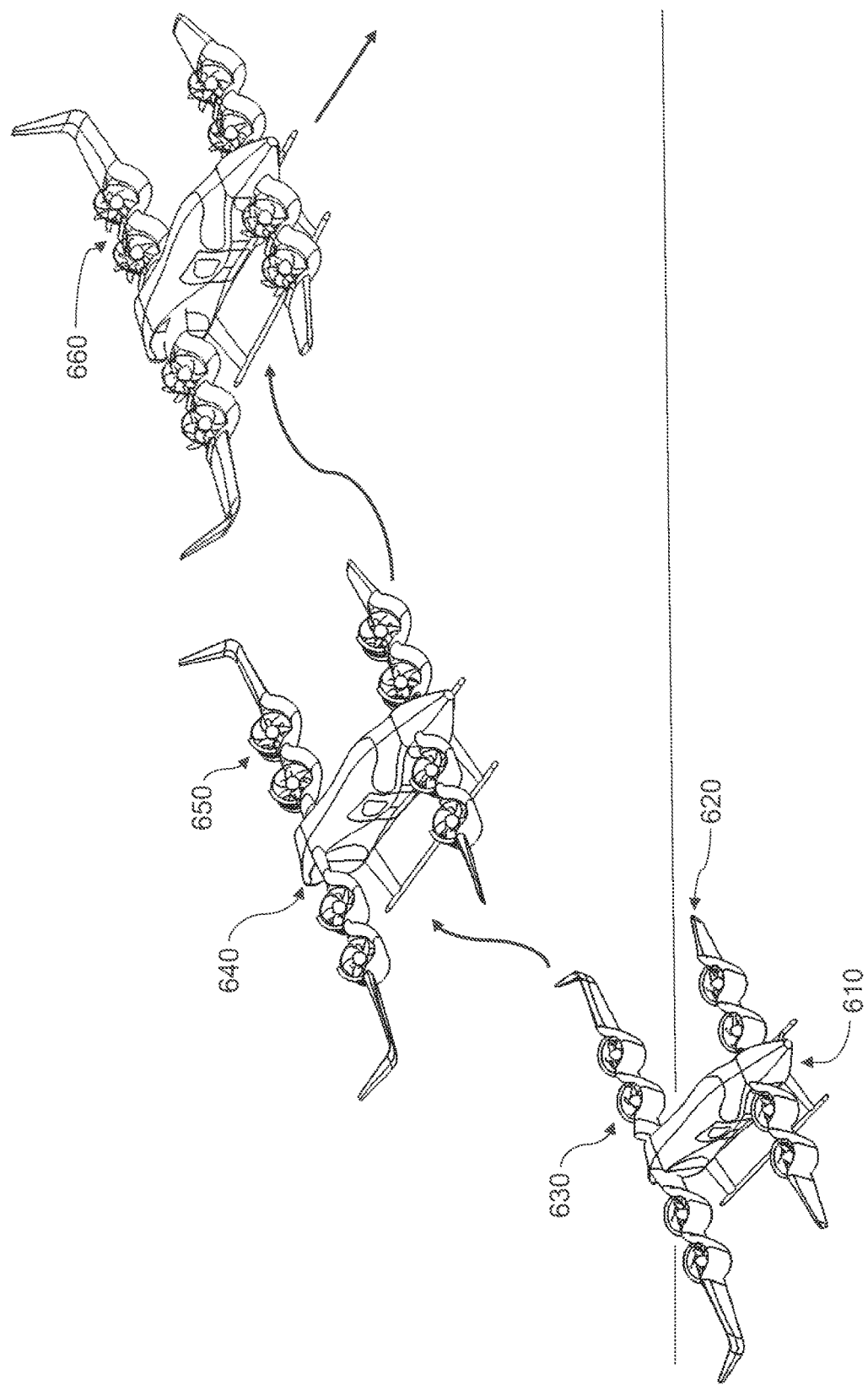
FIG. 6 is a perspective view of the takeoff sequence for a VTOL aircraft in relation to the retractable ducts, according to an embodiment.

FIG. 6 is a perspective view of the takeoff sequence for a VTOL aircraft in relation to the retractable ducts, according to an embodiment. When the aircraft is on the ground 610 and ready for takeoff the wings will be in the takeoff position 620 and the retractable duct will be fully extended 630. The aircraft will then transition into takeoff sequence by powering up all the propellers in the channel wings increasing altitude. The following sequence for takeoff is called the transition phase. 640 During the transition phase the aircraft begins to move forward by changing the angle of incidence of the wings. As the aircraft gains more forward momentum, the retractable duct automatically, or by aircrew command, stow themselves inside the channel wings. 650 After the transition phase the aircraft is now in forward cruise and all the retractable shrouds are stowed inside the wings. 660 This process would be the same but in reverse for landing.

What is claimed is:

1. A method of safe and efficient flight, comprising:
    positioning a channel wing of an aircraft at an angle of greater than 45-degrees incident to a water line of the aircraft;
    extending a retractable duct or shroud over a propeller mounted in a channel of the channel wing;
    powering up the propeller that is surrounded by the extended duct in a manner that increases altitude;
    changing the angle of incidence of the wing in a manner that moves the aircraft forward; and
    retracting the retractable duct into the wing as forward momentum is gained, such that the retractable duct is stowed inside the wing for forward cruise, wherein the retractable duct comprises a forward duct, a rearward duct that is to the rear of the forward duct along an axis of the propeller, and a bridge duct that is positioned between the forward and rearward ducts, and wherein the retracting and stowing of the duct is performed using a guide ring that is rigid and has a low drag airfoil shape.

2. The method according to claim 1, further comprising extending the duct over the propeller in the channel during takeoff, before forward momentum is sufficient to achieve forward cruise, in a manner that increases lift and upward thrust.

3. The method according to claim 2, wherein the duct when extended, eliminates propeller tip vortices in a manner that increases propeller efficiency.

4. The method according to claim 2, wherein the duct comprises one or more sound absorption materials, and is configured to provide sound absorption, regardless of whether the duct is extended.

5. The method according to claim 1, further comprising:
retracting the duct and stowing the duct inside the wing during forward cruise;
decreasing aircraft drag; and
increasing lift.

6. The method according to claim 1, wherein the extending of the duct is performed either automatically by a control system or manually by an aircrew.

7. The method according to claim 6, wherein extending the duct manually is performed by use of one or more of a single gear, and a ring gear.

* * * * *